June 21, 1938.  H. Z. GRAY  2,121,384

COMPOSITE SPONGE

Filed April 30, 1936

INVENTOR
HARRY Z. GRAY

BY Albert L. Ely

ATTORNEY

Patented June 21, 1938

2,121,384

UNITED STATES PATENT OFFICE 2,121,384

COMPOSITE SPONGE

Harry Z. Gray, Lebanon, Ohio

Application April 30, 1936, Serial No. 77,203

11 Claims. (Cl. 15—105)

This invention relates to composite sponges, and more especially it relates to laminated composite sponges composed of layers of at least two different materials.

The chief objects of the invention are to provide a sponge having improved abrasive characteristics as compared to ordinary marine sponges and cellular rubber sponges, and which has greater capacity for absorbing and retaining water than fibrous sponges consisting of loofah (*Luffa aegyptiaca*) or similar material. More specifically the invention aims to provide a composite sponge structure of loofah and cellular sponge rubber of such construction and arrangement that the loofah fibre is available for contact with the surface to be sponged and cleaned, and the rubber sponge is available, in the manner of a reservoir, for supplying water to the loofah and for absorbing water expressed from the loofah. Another object is to provide a composite sponge having a greater range of useful application than its constituent parts used alone.

Of the accompanying drawing.

Figure 1:
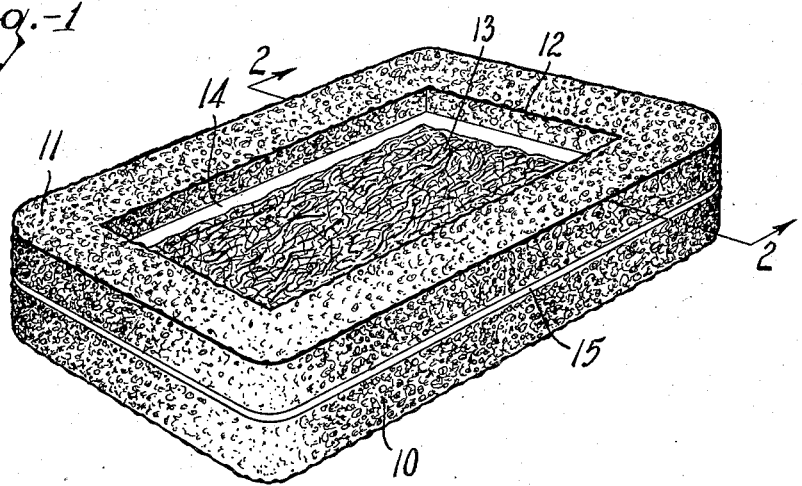
Figure 1 is a perspective view of the improved sponge, in its preferred form.
Figure 2:
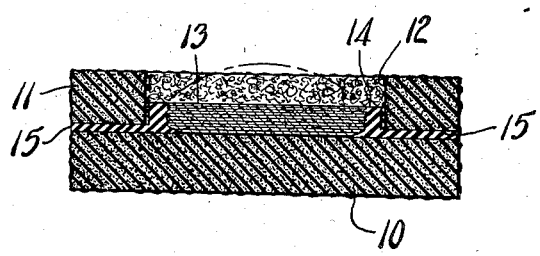
Figure 2 is a section taken on the line 2—2 of Figure 1.

Referring now to Figures 1 and 2 of the drawing, 10 is a generally rectangular layer of soft, cellular, vulcanized rubber composition commonly known as sponge rubber, 11 is a layer of sponge rubber having the overall dimensions of layer 10 and being formed with a central, rectangular aperture or opening 12 therethrough, 13 is a rectangular loofah sponge consisting of several (about ten) layers of dry, compressed loofah, 14 is a binder of soft, flexible rubber vulcanized to the margin of the loofah structure, on the four sides thereof, and 15 is a rubber flange formed integral with the binder 14 and extending outwardly therefrom in the plane of the loofah structure, flush with the bottom face of the latter, said flange being disposed between the sponge rubber layers 10, 11 and being adhered to each of them by rubber cement.

The layers 10 and 11 preferably are cut from larger sheets of sponge rubber, and are free from surface skin so that their cells are exposed. Thus the sponge rubber is highly absorbent and can retain a substantial quantity of water. The loofah sponge 13 is cut from larger pieces thereof, and the number of its plies may vary according to the particular use for which the improved sponge is designed. The rubber binding 14 vulcanized to the margin of the loofah structure penetrates the interstices of the fibres adjacent the said margin and thereby firmly binds together the several loofah plies, and in addition it secures the severed fibres of the loofah so that the latter does not fray during use and when it expands due to the presence of water.

The flanges 15 to which the sponge rubber layers are attached do not impair the natural resilience of the composite structure, yet they hold the loofah securely in place. Moreover, the sponge rubber is at no place cemented directly to the loofah, with the result that water will pass freely from one to the other. It will also be observed that the sponge ply 11 is not cemented to the marginal face of the binder 14, which arrangement makes for flexibility of the structure. When saturated with water the loofah swells substantially to the extent indicated in broken lines in Figure 2, and thus may extend through the opening 12 in the rubber ply 11 and project somewhat above the exposed face of the latter.

The composite sponge may be used in most situations where loofah sponges and cellular rubber sponges heretofore have been used. The improved sponge, however, is particularly adapted for use in washing the windshield of motor vehicles. As is well known, bugs and insects frequently are killed by impact with the windshields of fast moving vehicles, the force of the impact usually being sufficient to crush the bugs and leave them adhered to the windshield. Since the bugs are insoluble in water, difficulty frequently is encountered in removing them by the use of soft cloths or sponges. In such situations the loofah fibres of the composite sponge are especially efficacious for the reason that they are coarse and harsh and exert a strong abrasive action upon the insects so as quickly to remove them. The rubber sponge surrounding the loofah retains water for removing water-soluble matter, and it also serves to absorb any water squeezed from the loofah so that said water does not flow down the windshield and onto the cowl of the vehicle.

The composite sponge also may be used on the person while bathing, in which situation the coarse loofah fibres have a stimulating effect upon the skin not possible to be attained with softer sponges.

Figure 3:
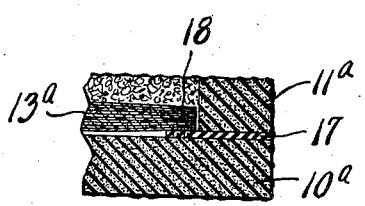
Figure 3 is a fragmentary transverse section of another embodiment of the invention.

The embodiment of the invention shown in Figure 3 is substantially identical with that previously described except that the binder 14 and its integral flange 15 are dispensed with and in their place is provided a flat vulcanized rubber strip 17, to one marginal portion of which a marginal portion of the loofah structure 13a is stitched, as shown at 18. The sponge rubber plies 10a, 11a are cemented to the projecting portion of strip 17 in the manner previously described. The strip 17 may be made endless in the form of a hollow rectangle, or it may be made in four sections for attachment to the four sides of the loofah structure. This embodiment possesses substantially all of the advantages of the first described embodiment, and is cheaper to manufacture.

Other modifications may be resorted to without departing from the spirit of the invention or the scope of the appended claims.

What is claimed is:

1. A composite sponge comprising a layer of natural loofah and at least one layer of soft porous rubber arranged face to face in moisture transferring relation.

2. A composite sponge comprising a layer of loofah and at least one layer of cellular soft porous rubber arranged in face to face relation, and means engaging solely the marginal portion of the loofah layer for securing it to the rubber layer.

3. A composite sponge comprising a layer of loofah, at least one layer of cellular rubber face to face therewith in moisture transferring relation, and a binder of rubber composition vulcanized locally to the margin of the loofah layer and adhered to the cellular rubber layer exteriorly of the area bounded by said margin.

4. A composite sponge comprising a layer of loofah, at least one layer of cellular rubber, and a marginal binder of rubber composition vulcanized to the loofah layer, said binding being formed with an integral, outwardly extending flange that is adhesively attached to the layer of cellular rubber.

5. A composite sponge comprising a cellular rubber structure formed with a recess in one face thereof, and a structure of natural loofah fibre mounted in said recess in moisture transferring relation to said rubber structure.

6. A composite sponge comprising two layers of cellular rubber of which one layer is formed with a central opening therein, a layer of loofah positioned in said opening, and a binder of rubber vulcanized to the marginal portion of the loofah layer, said binder being formed with a flange that extends between the cellular rubber layers and is adhered to each of them.

7. A composite sponge comprising a cellular rubber structure formed with a recess in one face thereof, and a loofah structure permanently secured in the bottom of said recess, the top of the loofah structure, when dry, being disposed below the top of the recess, and extending above the top of said recess when wet.

8. A composite sponge comprising a layer of loofah, at least one layer of cellular rubber face to face therewith in moisture transferring relation, and a marginal flange of flexible rubber composition stitched to the loofah layer and adhesively attached to the layer of cellular rubber.

9. A composite sponge comprising two layers of cellular soft rubber of which one layer is formed with a central opening therein, a layer of loofah positioned in said opening, and a strip of soft rubber extending about the loofah layer on one side thereof, one marginal portion of the said strip being stitched to the marginal portion of the loofah layer, the other marginal portion of the strip being disposed between the cellular rubber layers and adhered to both of them.

10. A composite sponge comprising a body of cellular rubber composition and a body of natural loofah fibre united to each other in moisture transfer relation and arranged side by side for concurrent application to a surface to be sponged.

11. A structure adapted to be incorporated in a composite sponge, said structure consisting of a pad of natural loofah fibre, and a binder of vulcanized rubber disposed in the plane of the pad, outside the margins of the latter and bonded solely to said margins by vulcanization.

HARRY Z. GRAY.